United States Patent
Yuan et al.

(10) Patent No.: US 12,483,304 B2
(45) Date of Patent: Nov. 25, 2025

(54) CONFIGURATION FOR PHASE TRACKING REFERENCE SIGNAL PORTS TO ENABLE UPLINK TRANSMISSION WITH MULTIPLE CODEWORDS

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 256 days.

(21) Appl. No.: 17/905,781

(22) PCT Filed: Mar. 20, 2020

(86) PCT No.: PCT/CN2020/080344
§ 371 (c)(1),
(2) Date: Sep. 7, 2022

(87) PCT Pub. No.: WO2021/184336
PCT Pub. Date: Sep. 23, 2021

(65) Prior Publication Data
US 2024/0214041 A1    Jun. 27, 2024

(51) Int. Cl.
*H04B 7/0456*    (2017.01)
*H04L 5/00*    (2006.01)

(52) U.S. Cl.
CPC .......... *H04B 7/0473* (2013.01); *H04L 5/005* (2013.01)

(58) Field of Classification Search
CPC .. H04B 7/0473; H04B 7/0665; H04B 7/0456; H04L 5/005; H04L 5/0007; H04L 1/0003; H04W 72/232
See application file for complete search history.

(56) References Cited

U.S. PATENT DOCUMENTS

| 2019/0158171 A1* | 5/2019 | Ren | H04B 7/0663 |
| 2019/0296876 A1* | 9/2019 | Zhang | H04L 5/0048 |
| 2020/0076647 A1 | 3/2020 | Zhang et al. | |

FOREIGN PATENT DOCUMENTS

| CN | 108111272 A | 6/2018 |
| CN | 108259145 A | 7/2018 |

(Continued)

OTHER PUBLICATIONS

Huawei, et al., "Enhancements on Multi-TRP/Panel Transmission", 3GPP Draft, 3GPP TSG RAN WG1 Meeting #94bis, R1-1810104, 3rd Generation Partnership Project (3GPP), Mobile Competence Centre; 650, Route Des Lucioles; F-06921, Sophia-Antipolis Cedex; France, vol. RAN WG1, No. Chengdu, China; Oct. 8, 2018-Oct. 12, 2018, Sep. 29, 2018 (Sep. 29, 2018), XP051517519, 18 Pages, Oct. 12, 2018 (Oct. 12, 2018), section 1, Retrieved from the Internet: URL: http://www.3gpp.org/ftp/tsg%5Fran/WG1%5FRL1/TSGR1%5F94b/Docs/R1%2D1810104%2Ezip, the whole document.

(Continued)

*Primary Examiner* — Thai Nguyen
(74) *Attorney, Agent, or Firm* — Harrity & Harrity, LLP / Qualcomm Incorporated

(57) ABSTRACT

Various aspects of the present disclosure generally relate to wireless communication. In some aspects, a user equipment may determine an association between multiple phase tracking reference signal (PTRS) ports and multiple codewords that are to be used for an uplink communication that uses multiple antenna port groups, and transmit the uplink communication using the multiple codewords based at least in part on the association. Numerous other aspects are provided.

32 Claims, 7 Drawing Sheets

(56) References Cited

FOREIGN PATENT DOCUMENTS

| CN | 108737047 A | 11/2018 | |
|---|---|---|---|
| CN | 109194453 A | 1/2019 | |
| WO | WO-2018202128 A1 * | 11/2018 | ............ H04L 1/0003 |
| WO | WO-2019029662 A1 | 2/2019 | |
| WO | 2021184296 A1 | 9/2021 | |
| WO | 2021185089 A1 | 9/2021 | |

OTHER PUBLICATIONS

International Search Report and Written Opinion—PCT/CN2020/080344—ISA/EPO—Dec. 21, 2020.

3GPP: "3rd Generation Partnership Project, Technical Specification Group Radio Access Network, NR, Physical Layer Procedures for Data (Release 16)", 3GPP TS 38.214, V16.0.0, Dec. 2019, Jan. 14, 2020, pp. 1-147, Section 5.2, Table 6.2.3.1-1, Table 6.2.3.1-2, Table 6.2.3.1-3, section 5.1.6.2, pp. 41.

CATT: "Remaining Issues on PT-RS", 3GPP TSG RAN WG1 Meeting AH 1801, R1-1800246, 3rd Generation Partnership Project, Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018, 5 Pages, XP051384724, Section 2.

Ericsson: "Feature lead Summary 2 of PT-RS", 3GPP TSG RAN WG1 Meeting AH 1801, R1-1801076, 3rd Generation Partnership Project, Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 26, 2018, pp. 1-7, XP051385337, Section 5.

Supplementary European Search Report—EP20925252—Search Authority—Munich—Nov. 9, 2023.

3GPP TS 38.214: "3rd Generation Partnership Project, Technical Specification Group Radio Access Network, NR, Physical Layer Procedures for Data (Release 15)", 3GPP TS 38.214 v1.1.2, Nov. 30, 2017, pp. 1-60, Section 6.2.3.

* cited by examiner

CONFIGURATION FOR PHASE TRACKING REFERENCE SIGNAL PORTS TO ENABLE UPLINK TRANSMISSION WITH MULTIPLE CODEWORDS

CROSS-REFERENCE TO RELATED APPLICATION

This Patent Application is a 371 national stage of PCT Application No. PCT/CN2020/080344 filed on Mar. 20, 2020, entitled "CONFIGURATION FOR PHASE TRACKING REFERENCE SIGNAL PORTS TO ENABLE UPLINK TRANSMISSION WITH MULTIPLE CODEWORDS," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for configuration for phase tracking reference signal (PTRS) ports.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining an association between multiple PTRS ports and multiple codewords that are to be used for an uplink communication that uses multiple antenna port groups. The method may include transmitting the uplink communication using the multiple codewords based at least in part on the association.

In some aspects, a method of wireless communication, performed by a base station, may include determining transmission parameters for multiple codewords of a UE that are to be used for an uplink communication that uses multiple antenna port groups. The method may include transmitting downlink control information (DCI) that identifies the transmission parameters to enable the UE to determine an association between multiple PTRS ports and the multiple codewords.

In some aspects, a UE for wireless communication may include a memory and one or more processors coupled to the memory. The memory and the one or more processors may be configured to determine an association between multiple PTRS ports and multiple codewords that are to be used for an uplink communication that uses multiple antenna port groups. The memory and the one or more processors may be configured to transmit the uplink communication using the multiple codewords based at least in part on the association.

In some aspects, a base station for wireless communication may include a memory and one or more processors coupled to the memory. The memory and the one or more processors may be configured to determine transmission parameters for multiple codewords of a UE that are to be used for an uplink communication that uses multiple antenna port groups. The memory and the one or more processors may be configured to transmit DCI that identifies the transmission parameters to enable the UE to determine an association between multiple PTRS ports and the multiple codewords.

In some aspects, a non-transitory computer-readable medium may store one or more instructions for wireless communication. The one or more instructions, when executed by one or more processors of a UE, may cause the one or more processors to determine an association between multiple PTRS ports and multiple codewords that are to be used for an uplink communication that uses multiple antenna port groups. The one or more instructions may cause the one or more processors to transmit the uplink communication using the multiple codewords based at least in part on the association.

In some aspects, a non-transitory computer-readable medium may store one or more instructions for wireless communication. The one or more instructions, when executed by one or more processors of a base station, may cause the one or more processors to determine transmission parameters for multiple codewords of a UE that are to be used for an uplink communication that uses multiple antenna port groups. The one or more instructions may cause the one or more processors to transmit DCI that identifies the transmission parameters to enable the UE to determine an association between multiple PTRS ports and the multiple codewords.

In some aspects, an apparatus for wireless communication may include means for determining an association between multiple PTRS ports and multiple codewords that are to be used for an uplink communication that uses multiple antenna port groups. The apparatus may include means for transmitting the uplink communication using the multiple codewords based at least in part on the association.

In some aspects, an apparatus for wireless communication may include means for determining transmission parameters for multiple codewords of a UE that are to be used for an uplink communication that uses multiple antenna port groups. The apparatus may include means for transmitting DCI that identifies the transmission parameters to enable the UE to determine an association between multiple PTRS ports and the multiple codewords.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
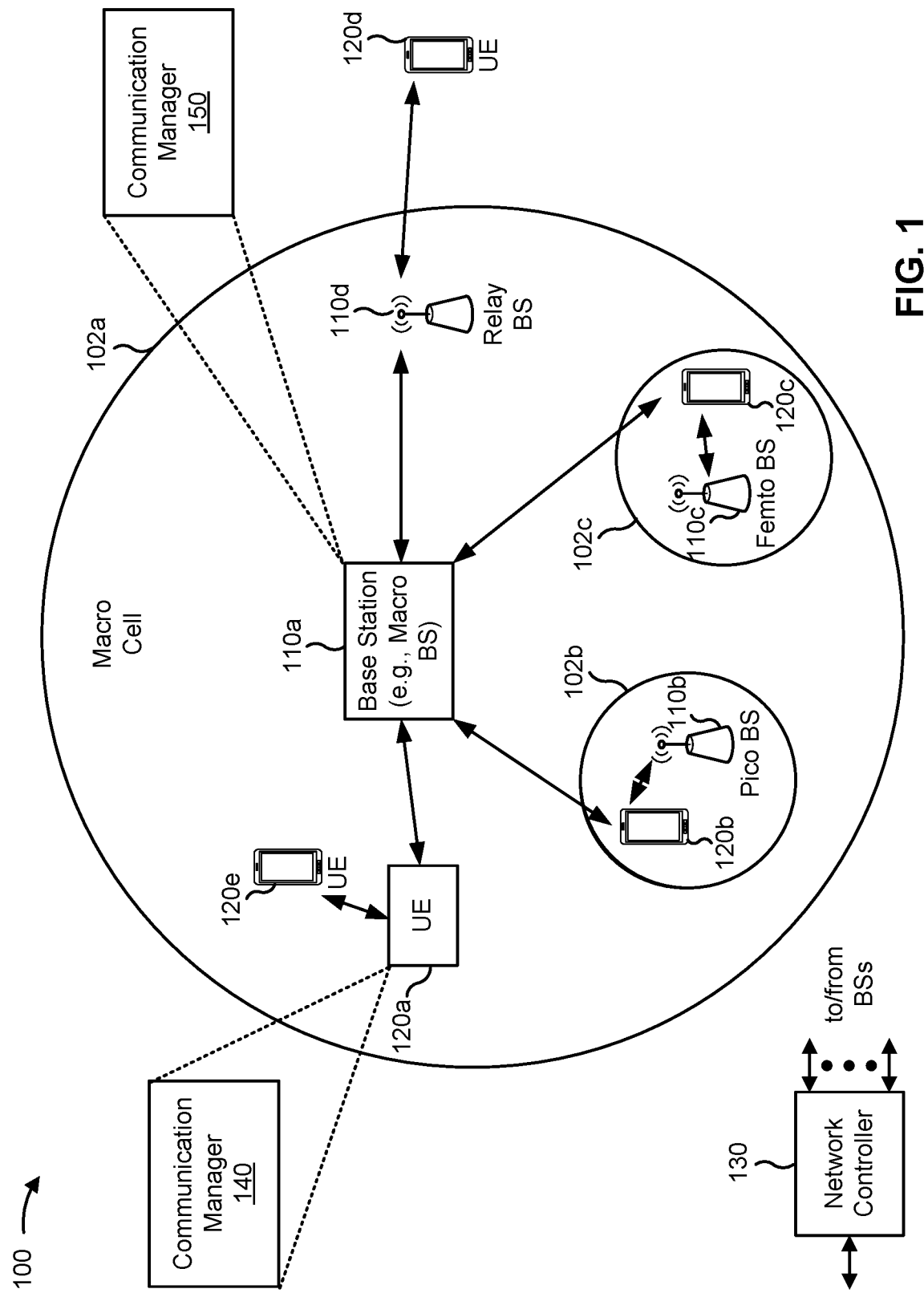
FIG. 1 is a block diagram conceptually illustrating an example of a wireless communication network, in accordance with various aspects of the present disclosure.

A UE may use multiple antenna panels for an uplink communication (e.g., for a non-coherent joint transmission). In addition, a UE may use multiple codewords (e.g., two codewords) for an uplink communication that uses multiple antenna panels to thereby improve uplink throughput. For example, the UE may transmit a first codeword using multiple transmission layers for a first antenna panel, and a second codeword using multiple transmission layers for a second antenna panel.

It may be useful for the UE to determine a PTRS configuration for the multiple codewords used for an uplink communication. For example, it may be useful for the UE to determine an association between PTRS ports and codewords, an association between PTRS ports and antenna panels, an association between PTRS ports and DMRS ports, a PTRS density that is to be used for a codeword, a PTRS power boosting that is to be used for a codeword, and/or the like. Some techniques and apparatuses described herein provide PTRS configuration for multiple codewords used for an uplink communication.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as may be implemented as NB-IOT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may determine an association between multiple PTRS ports and multiple codewords that are to be used for an uplink communication that uses multiple antenna port groups, transmit the uplink communication using the multiple codewords based at least in part on the association, and/or the like. Additionally, or alternatively, the communication manager 140 may perform one or more other operations described herein.

Similarly, the base station 110 may include a communication manager 150. As described in more detail elsewhere herein, the communication manager 150 may determine transmission parameters for multiple codewords of a UE that are to be used for an uplink communication that uses multiple antenna port groups, transmit DCI that identifies the transmission parameters to enable the UE to determine an association between multiple PTRS ports and the multiple codewords, and/or the like. Additionally, or alternatively, the communication manager 150 may perform one or more other operations described herein.

As indicated above, FIG. 1 is provided merely as an example. Other examples may differ from what is described with regard to FIG. 1.

Figure 2:
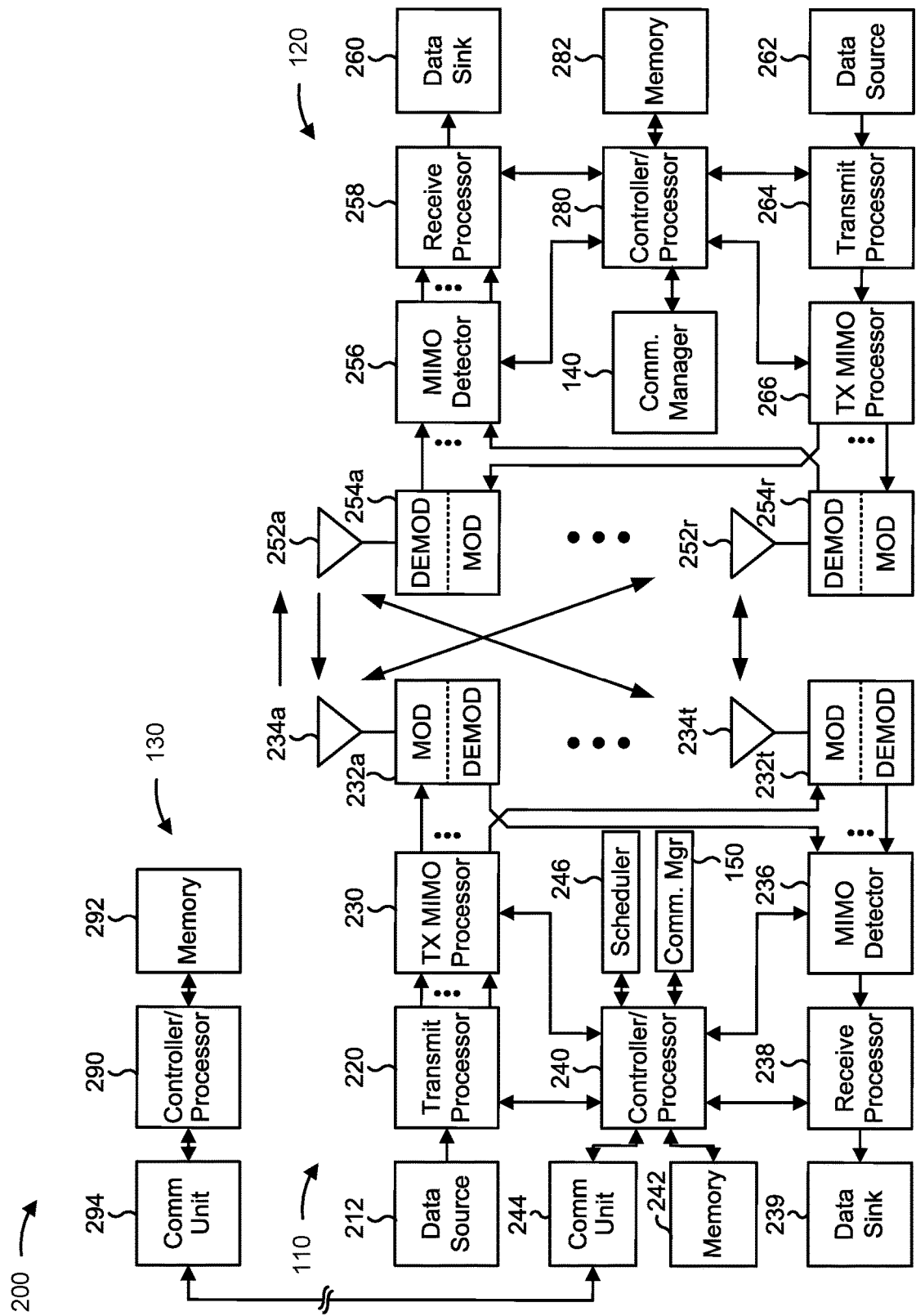
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuration for PTRS ports to enable uplink transmission with multiple codewords, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for determining an association between multiple PTRS ports and multiple codewords that are to be used for an uplink communication that uses multiple antenna port groups, means for transmitting the uplink communication using the multiple codewords based at least in part on the association, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, the base station 110 may include means for determining transmission parameters for multiple codewords of a UE that are to be used for an uplink communication that uses multiple antenna port groups, means for transmitting DCI that identifies the transmission parameters to enable the UE to determine an association between multiple PTRS ports and the multiple codewords, and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

As indicated above, FIG. 2 is provided merely as an example. Other examples may differ from what is described with regard to FIG. 2.

Figure 3:
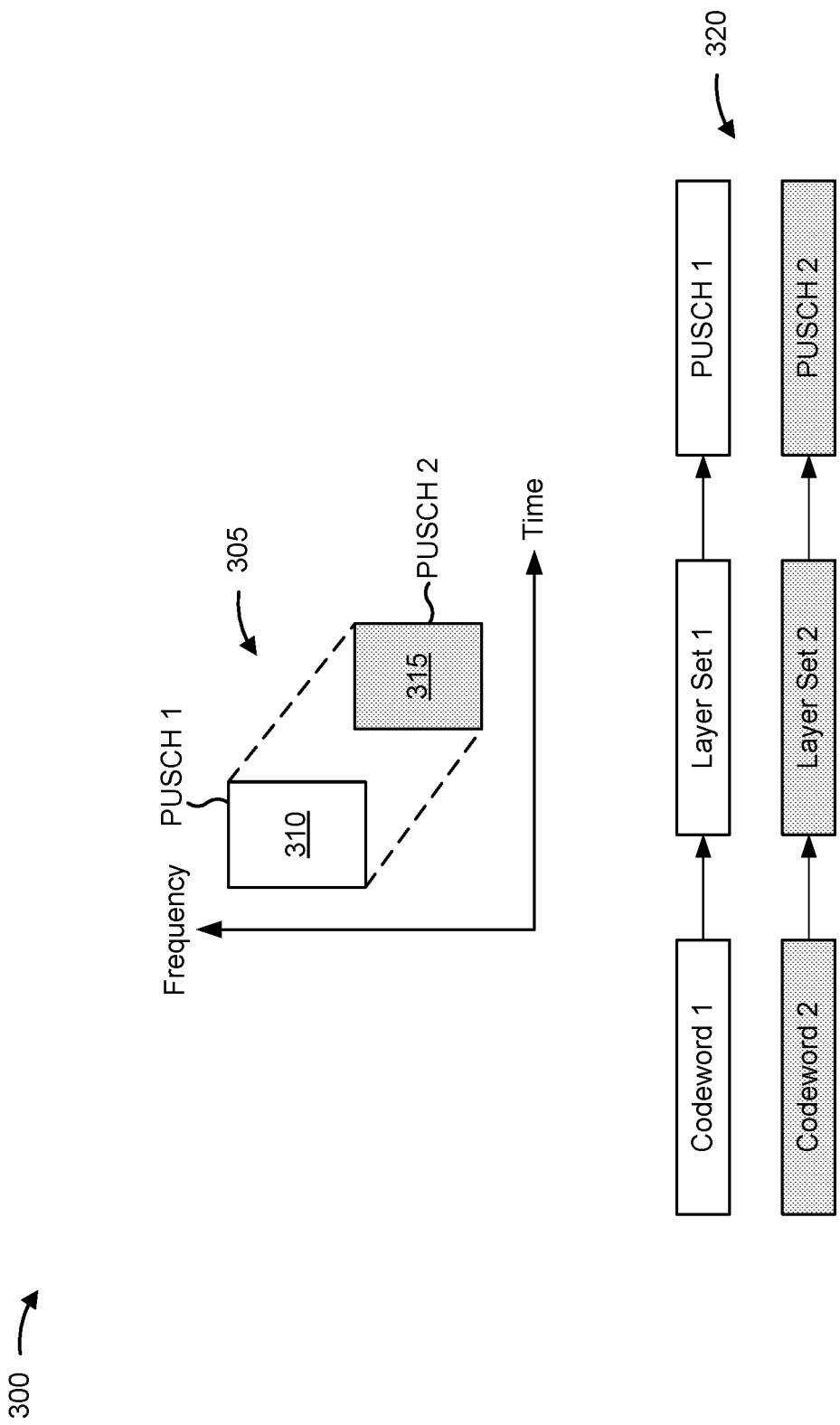
FIG. 3 is a diagram illustrating an example of spatial division multiplexing, in accordance with various aspects of the present disclosure.

FIG. 3 is a diagram illustrating an example of spatial division multiplexing, in accordance with various aspects of the present disclosure. In particular, reference number 305 shows spatial division multiplexing of a first physical uplink shared channel (PUSCH) transmission 310 (shown as PUSCH 1) and a second PUSCH transmission 315 (shown as PUSCH 2). In spatial division multiplexing (e.g., non-coherent joint transmission), a UE may transmit the first PUSCH transmission 310 and the second PUSCH transmission 315 in a same time and frequency resource, as scheduled by a single DCI.

In some aspects, a UE may transmit the first PUSCH transmission 310 using a first antenna panel of the UE, and the second PUSCH transmission 315 using a second antenna panel of the UE. In other words, the UE may form a first beam on the first antenna panel using a first precoding, and form a second beam on the second antenna panel using a second precoding. For a non-coherent joint transmission, the precoding (P) may be represented by $P=[v_1^A v_2^B]$, where $v_1^A$ represents a precoder for a first layer for a first antenna panel (A), and $v_2^B$ represents a precoder for a second layer for a second antenna panel (B). In some aspects, a UE may transmit an uplink communication based at least in part on a dynamic panel selection using precoding that may be represented by $P=[v_1^A v_2^B]$ or $[v_1^B v_2^B]$. In some aspects, a UE may transmit an uplink communication using a single antenna panel using precoding that may be represented by $P=[v_1 v_2 \ldots v_L]$, where $v_L$ represents a precoder for a layer L.

As shown by reference number 320, the first PUSCH transmission (PUSCH 1) may be associated with a first set of multiple transmission layers (shown as Layer Set 1), and the second PUSCH transmission (PUSCH 2) may be associated with a second set of multiple transmission layers (shown as Layer Set 2). Moreover, the first set of layers (e.g., for a MIMO transmission) may be associated with a first codeword (shown as Codeword 1), and the second set of layers (e.g., for a MIMO transmission) may be associated with a second codeword (shown as Codeword 2). The first codeword and the second codeword may be transport blocks.

As indicated above, FIG. 3 is provided as an example. Other examples may differ from what is described with respect to FIG. 3.

Figure 4:
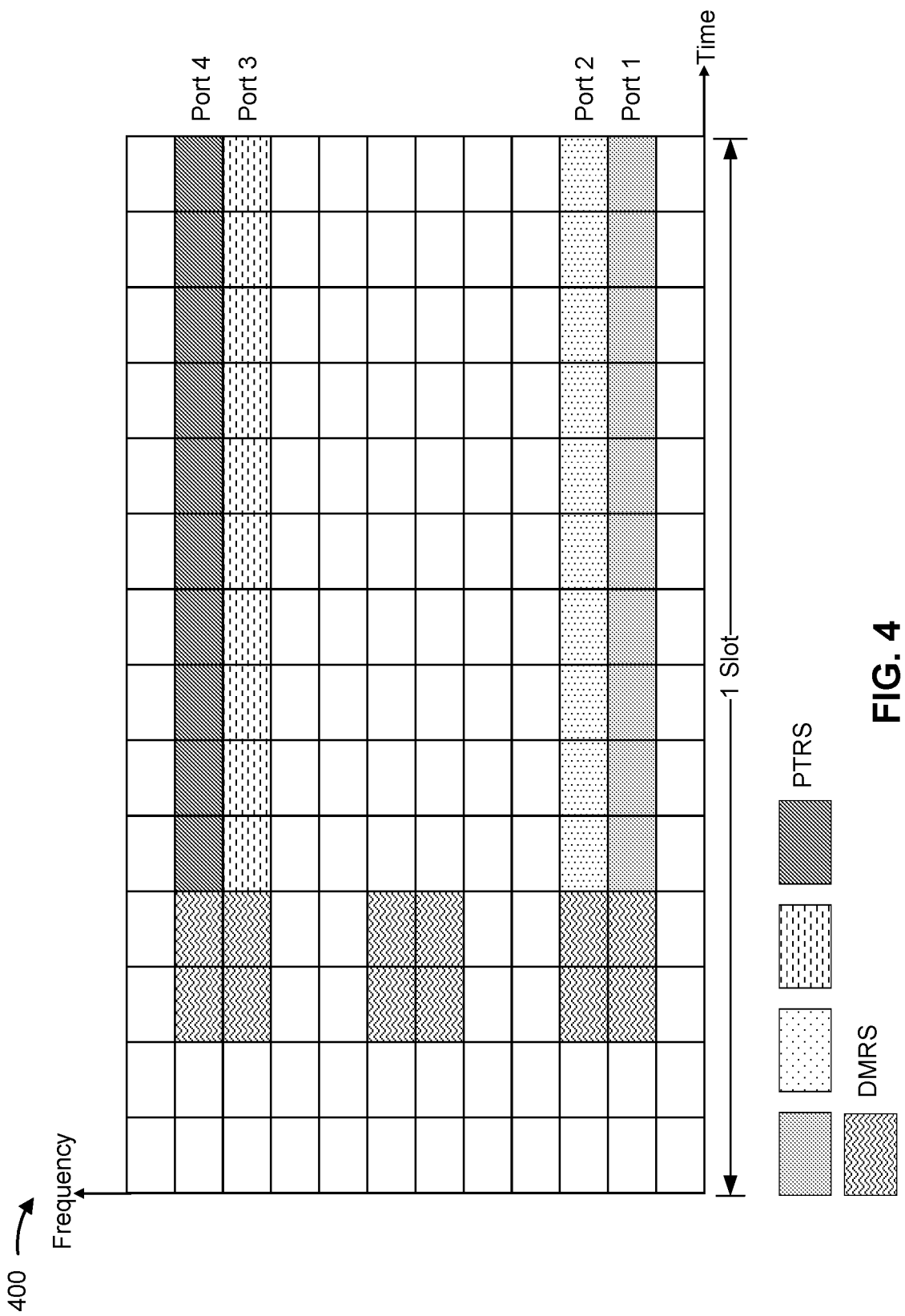
FIG. 4 is a diagram illustrating an example of PTRS and demodulation reference signal (DMRS) communication, in accordance with various aspects of the present disclosure.

FIG. 4 is a diagram illustrating an example of PTRS and DMRS communication, in accordance with various aspects of the present disclosure. In particular, FIG. 4 shows transmission of PTRSs and DMRSs in a slot (e.g., 14 OFDM symbols in a time domain). For example, a UE may transmit a PTRS in a layer that is mapped to a particular DMRS port. As shown in FIG. 4, a first PTRS port (shown as Port 1), a second PTRS port (shown as Port 2), a third PTRS port (shown as Port 3), and a fourth PTRS port (shown as Port 4) may be orthogonal (e.g., may occupy different resource elements in frequency).

A PTRS may be used to correct phase noise (e.g., oscillator phase noise), especially for millimeter wave communications. In non-codebook-based uplink, a UE may identify one or more PTRS ports based at least in part on a sounding reference signal (SRS) resource indicator (SRI) for an uplink communication. For example, an SRI may identify one or more multiple SRS resources, and each SRS resource may be configured with a particular PTRS port. In codebook-based uplink, a UE may identify one or more PTRS ports based at least in part on a transmit precoding matrix indicator (TPMI) and an indicated quantity of layers for an uplink communication.

As described above, a UE may use multiple antenna panels for an uplink communication (e.g., for a non-coherent joint transmission). In some aspects, an antenna panel used for an uplink communication may be referred to as a PUSCH antenna port group (or an antenna port group). In addition, as described above, a UE may use multiple codewords (e.g., two codewords) for an uplink communication that uses multiple antenna panels to thereby improve uplink throughput. For example, the UE may transmit a first codeword using multiple transmission layers for a first antenna port group, and a second codeword using multiple transmission layers for a second antenna port group.

It may be useful for the UE to determine a PTRS configuration for the multiple codewords used for an uplink communication. For example, it may be useful for the UE to determine an association between PTRS ports and codewords, an association between PTRS ports and antenna port subgroups, an association between PTRS ports and DMRS ports (which may be referred to herein as a PTRS-DMRS association), a PTRS density that is to be used for a codeword, a PTRS power boosting that is to be used for a codeword, and/or the like. Some techniques and apparatuses described herein provide PTRS configuration for multiple codewords used for an uplink communication.

As indicated above, FIG. 4 is provided as an example. Other examples may differ from what is described with respect to FIG. 4.

Figure 5:
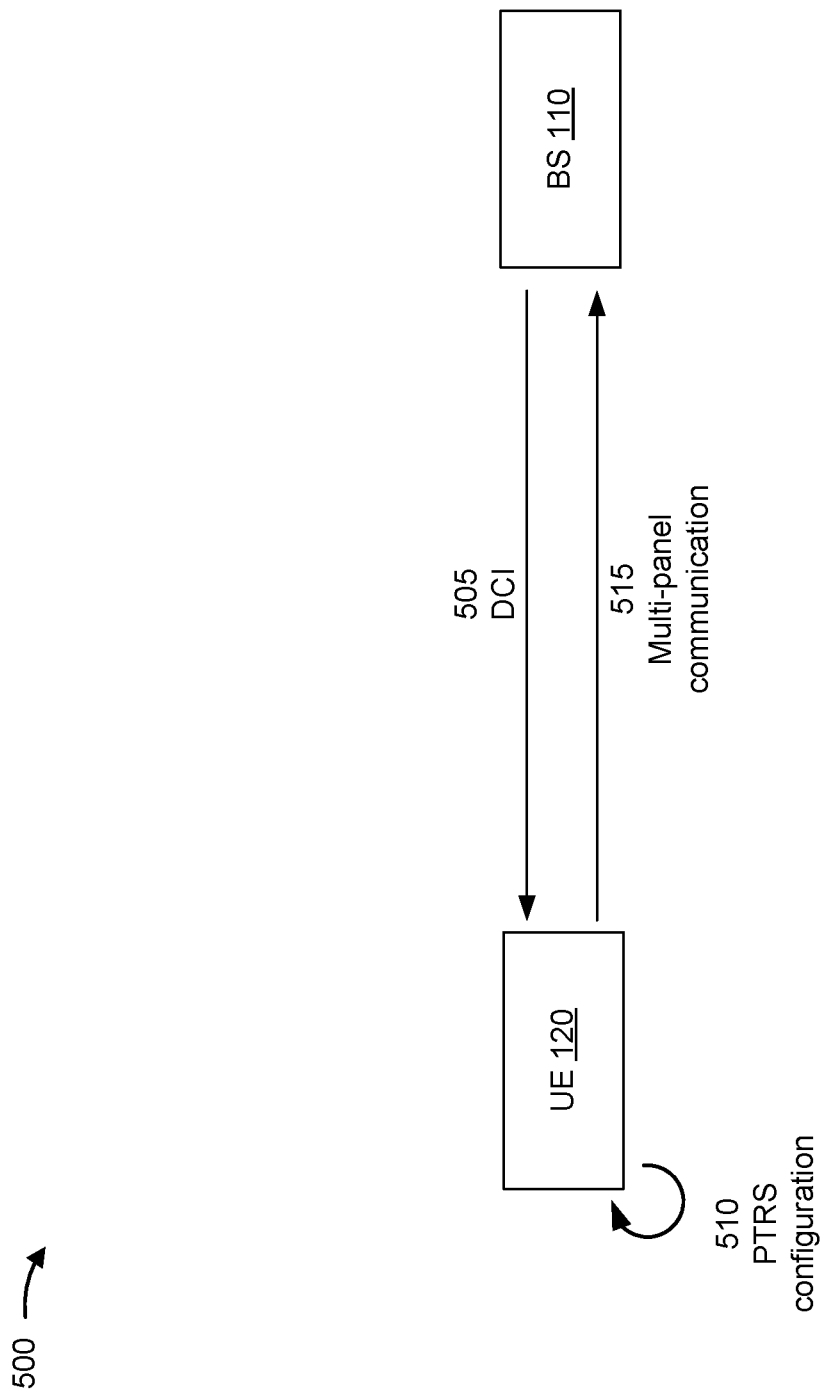
FIG. 5 is a diagram illustrating an example of configuration for PTRS ports to enable uplink transmission with multiple codewords, in accordance with various aspects of the present disclosure.

FIG. 5 is a diagram illustrating an example 500 of configuration for PTRS ports to enable uplink transmission with multiple codewords, in accordance with various aspects of the present disclosure. As shown in FIG. 5, a UE 120 and a BS 110 may communicate with each other. In some aspects, the UE 120 may employ multiple transmit antenna panels (e.g., multiple PUSCH antenna port groups). For example, the UE 120 may use a first antenna port group to transmit a first codeword in multiple transmission layers, and a second antenna port group to transmit a second codeword in multiple transmission layers. In some aspects, the first codeword may be associated with a first index value (e.g., codeword 0) and the second codeword may be associated with a second index value (e.g., codeword 1).

As shown by reference number 505, the BS 110 may transmit, and the UE 120 may receive, DCI that schedules an uplink communication of the UE 120. For example, the DCI may schedule a multi-panel uplink communication of the UE 120, such as a first PUSCH transmission (e.g., of multiple layers) on a first antenna panel of the UE 120 and a second PUSCH transmission (e.g., of multiple layers) on a second antenna panel of the UE 120. The DCI may enable the UE 120 to determine an association between PTRS ports and multiple codewords, as described below. In some aspects, the UE 120 may receive the DCI from a first TRP (e.g., associated with the BS 110), and the DCI may schedule an uplink multi-panel communication to the first TRP and a second TRP (e.g., associated with the BS 110 or another BS).

In some aspects, the DCI may identify transmission parameters for the uplink communication of the UE 120. For example, the BS 110 may determine transmission parameters for multiple codewords (e.g., two codewords) of the UE 120, and the DCI may identify the transmission parameters that are determined. Accordingly, the transmission parameters indicated by the DCI may include a first set of transmission parameters for a first PUSCH transmission of the UE 120, and a second set of transmission parameters for a second PUSCH transmission of the UE 120.

The transmission parameters may include one or more precoding indicators, such as one or more TPMIs (e.g., for codebook-based uplink) or one or more SRIs (e.g., for non-codebook-based uplink). For example, the transmission parameters may include a first precoding indicator for the first PUSCH transmission and a second precoding indicator for the second PUSCH transmission. A precoding indicator may identify multiple transmission layers that are to be transmitted using one or more antenna port subgroups of an antenna port group (e.g., a precoding indicator may identify a precoder matrix).

The transmission parameters may include one or more uplink beam identifiers, such as one or more transmission configuration indicators (TCIs). For example, the transmission parameters may include a first beam identifier for the first PUSCH transmission and a second beam identifier for the second PUSCH transmission. A TCI may indicate a TCI state associated with a beam, and the TCI state may be associated with a reference signal (RS), such as an SRS resource, an SRS resource set, a channel state information (CSI)-RS, or a synchronization signal block (SSB) index. Accordingly, the UE 120 may transmit a PUSCH transmission using a beam or a spatial filter that corresponds to a beam or a spatial filter used for a reference signal associated with a TCI state indicated for the PUSCH transmission.

The transmission parameters may include one or more DMRS identifiers (e.g., one or more DMRS port indicators, DMRS code-division multiplexing (CDM) group identifiers, and/or the like). For example, the transmission parameters may include a single DMRS identifier that identifies DMRS ports for the first PUSCH transmission and the second PUSCH transmission. The DMRS identifier may identify DMRS ports associated with multiple (e.g., at least two) CDM groups. Accordingly, the first codeword for the first PUSCH transmission may be associated with a first uplink precoding indicator (e.g., a first TPMI) and a first DMRS group, and the second codeword for the second PUSCH transmission may be associated with a second uplink precoding indicator (e.g., a second TPMI) and a second DMRS group.

The transmission parameters may include one or more MCS identifiers. For example, the transmission parameters may include a first MCS identifier for the first PUSCH transmission and a second MCS identifier for the second PUSCH transmission. The transmission parameters may include one or more bandwidth identifiers (e.g., one or more bandwidth part identifiers). For example, the transmission parameters may include a first bandwidth identifier for the first PUSCH transmission and a second bandwidth identifier for the second PUSCH transmission. In some aspects, the bandwidth (e.g., bandwidth part) that is to be used for the first PUSCH transmission and the second PUSCH transmission is the same (e.g., the first bandwidth identifier and the second bandwidth identifier are the same).

In some aspects, the transmission parameters may identify one or more maximum quantities of PTRS ports (e.g., one or more maxNrofPorts parameters). For example, the transmission parameters may identify a first maximum quantity of PTRS ports (e.g., maxNrofPorts1) for the first codeword (e.g., for the first PUSCH transmission) and a second maximum quantity of PTRS ports (e.g., maxNrofPorts2) for the second codeword (e.g., for the second PUSCH transmission). In some aspects, a maximum quantity of PTRS ports for a codeword may be one PTRS port or more than one PTRS port (e.g., two PTRS ports). In some aspects, the UE 120 may be configured with a total of four PTRS ports (one or more of which may be associated with the first codeword and one or more of which may be associated with the second codeword), and the four PTRS ports may be orthogonal in frequency (as described in connection with FIG. 4).

In some aspects, the BS 110 may determine a maximum quantity of PTRS ports for a codeword based at least in part on a UE capability report on codebook type. For example, the UE 120 may transmit one or more capability reports that report a first codebook subset type for a first antenna port group (e.g., associated with the first codeword) used by the UE 120, and a second codebook subset type for a second antenna port group (e.g., associated with the second codeword) used by the UE 120. The codebook subset type reported by the UE 120 may be non-coherence; partial coherence and non-coherence (which may be referred to as partial/non-coherence); or full coherence, partial coherence, and non-coherence (which may be referred to as full/partial/non-coherence).

The BS 110 may determine a first maximum quantity of PTRS ports for the first codeword based at least in part on the first codebook subset type reported for the first antenna port group, and a second maximum quantity of PTRS ports for the second codeword based at least in part on the second codebook subset type reported for the second antenna port group. A maximum quantity of PTRS ports for a codeword may be one PTRS port when a codebook subset type reported for the codeword is full/partial/non-coherence. A maximum quantity of PTRS ports for a codeword may be more than one PTRS port (e.g., two PTRS ports) when a codebook subset type reported for the codeword is non-coherence or partial/non-coherence.

As shown by reference number 510, the UE 120 may determine a PTRS configuration for multiple codewords (e.g., two codewords). For example, the UE 120 may determine a first PTRS configuration for a first codeword that is to be transmitted using a first antenna port group (e.g., the first PUSCH transmission), and a second PTRS configuration for a second codeword that is to be transmitted using a second antenna port group (e.g., the second PUSCH transmission). The PTRS configuration for the multiple codewords may be based at least in part on the transmission parameters identified by the DCI.

In some aspects, the UE 120 may determine an association between PTRS ports and the multiple codewords. For example, the UE 120 may determine that one or more PTRS ports of a first set of PTRS ports (e.g., PTRS ports 0 and 1) are to be associated with the first codeword, and one or more PTRS ports of a second set of PTRS ports (e.g., PTRS ports 2 and 3) are to be associated with the second codeword (e.g., according to respective maximum quantities of PTRS ports for the first codeword and the second codeword).

In some aspects, the UE 120 may determine PTRS ports that are to be associated with the multiple codewords based at least in part on respective antenna port groups associated with the multiple codewords. As described above, the first codeword may be associated with the first antenna port group and the second codeword may be associated with the second antenna port group. Moreover, the first antenna port group may include a first and a second antenna port subgroup, and the second antenna port group may include a first and a second antenna port subgroup. For example, the first antenna port group may include antennas 0, 1, 2, and 3, the first antenna port subgroup of the first antenna port group may include antennas 0 and 2, and the second antenna port subgroup of the first antenna port group may include antennas 1 and 3.

In an example, if the maximum quantity of PTRS ports for a codeword is more than one PTRS port (e.g., two PTRS ports), then a set of PTRS ports may be respectively associated with antenna port subgroups of an antenna port group associated with the codeword. That is, a first PTRS port may be associated with a first antenna port subgroup of the antenna port group, and a second PTRS port may be associated with a second antenna port subgroup of the antenna port group.

For example, if the maximum quantity of PTRS ports for the first codeword (e.g., maxNrofPorts1) is two PTRS ports (e.g., for a partial/non-coherence or non-coherence codebook subset type), then a first PTRS port (e.g., PTRS port 0) may be associated with a first antenna port subgroup of the first antenna port group, and a second PTRS port (e.g., PTRS port 1) may be associated with a second antenna port subgroup of the first antenna port group. Similarly, if the maximum quantity of PTRS ports for the second codeword (e.g., maxNrofPorts2) is two PTRS ports (e.g., for a partial/non-coherence or non-coherence codebook subset type), then a third PTRS port (e.g., PTRS port 2) may be associated with a first antenna port subgroup of the second antenna port group, and a fourth PTRS port (e.g., PTRS port 3) may be associated with a second antenna port subgroup of the second antenna port group.

In an example, if the maximum quantity of PTRS ports for a codeword is one PTRS port, then a single PTRS port may be associated with multiple antenna port subgroups of an antenna port group associated with the codeword. That is, the single PTRS port may be associated with a first antenna port subgroup and a second antenna port subgroup of the antenna port group. For example, if the maximum quantity of PTRS ports for the first codeword (e.g., maxNrofPorts1) is one PTRS port, then the first PTRS port (e.g., PTRS port 0) may be associated with a first antenna port subgroup and a second antenna port subgroup of the first antenna port group. Similarly, if the maximum quantity of PTRS ports for the second codeword (e.g., maxNrofPorts2) is one PTRS port, then the third PTRS port (e.g., PTRS port 2) may be associated with a first antenna port subgroup and a second antenna port subgroup of the second antenna port group.

In some aspects, the UE 120 may determine an actual quantity of PTRS ports that are to be associated with a codeword based at least in part on a precoding indicator (e.g., a TPMI or an SRI) identified in the DCI (e.g., when the codeword is to be transmitted in two layers, three layers, or four layers). For example, if a maximum quantity of PTRS ports that are to be associated with the codeword is more than one PTRS port (e.g., two PTRS ports), then multiple PTRS ports (e.g., two PTRS ports) may be associated with the codeword when the precoding indicator (e.g., a precoder matrix indicated by the precoding indicator) indicates precoders for a first antenna port subgroup and a second antenna port subgroup of an antenna port group associated with the codeword.

As another example, if a maximum quantity of PTRS ports that are to be associated with the codeword is more than one PTRS port (e.g., two PTRS ports), then only a single PTRS port may be associated with the codeword when the precoding indicator (e.g., a precoder matrix indicated by the precoding indicator) indicates precoders for only one of a first antenna port subgroup or a second antenna port subgroup of an antenna port group associated with the codeword. As a further example, if a maximum quantity of PTRS ports that are to be associated with the codeword is one PTRS port, then only a single PTRS port may be associated with the codeword.

In some aspects, the UE 120 may determine a PTRS-DMRS association based at least in part on an actual quantity of PTRS ports that are determined for a codeword. That is, the UE 120 may determine a mapping of a DMRS port to a PTRS port associated with a codeword. Accordingly, the UE 120 may use a precoding for the PTRS port that is used for a layer (associated with the DMRS port) identified by a precoding indicator for the codeword.

In some aspects, the UE 120 may determine a PTRS-DMRS association based at least in part on an indication in the DCI (e.g., for codebook-based MIMO). In one example, the actual quantity of PTRS ports associated with a codeword is one PTRS port, and the PTRS port may be shared by two layers that use the same antenna port subgroup (e.g., as indicated by a precoding indicator associated with the codeword) of an antenna port group associated with the codeword. In this example, a single bit of a PTRS-DMRS association field of the DCI, for the codeword, may indicate a layer of the two layers (e.g., the PTRS port is mapped to the DMRS port associated with the indicated layer).

For example, a first bit, for the first codeword, in the PTRS-DMRS association field may have a value of zero to indicate that a first DMRS port, of two DMRS ports (e.g., two DMRS ports respectively associated with two layers shared by a PTRS port), is to be associated with a PTRS port for the first codeword. Alternatively, the first bit may have a value of one to indicate that a second DMRS port, of the two DMRS ports, is to be associated with the PTRS port for the first codeword. Similarly, a second bit, for the second codeword, in the PTRS-DMRS association field may have a value of zero to indicate that a first DMRS port, of two DMRS ports (e.g., two DMRS ports respectively associated with two layers shared by a PTRS port), is to be associated with a PTRS port for the second codeword. Alternatively, the second bit may have a value of one to indicate that a second DMRS port, of the two DMRS ports, is to be associated with the PTRS port for the second codeword.

In another example, the actual quantity of PTRS ports associated with a codeword is one or two PTRS ports, and the PTRS port(s) may be shared by more than two layers (e.g., four layers), such as when the codeword may be transmitted using more than two layers (e.g., using four layers). In this example, two bits of a PTRS-DMRS association field of the DCI may indicate a mapping of PTRS ports to layers (e.g. DMRS ports associated with the layers) as described in 3GPP Release 15. For example, each bit of the PTRS-DMRS association field may indicate an index value of a mapping that identifies a PTRS-DMRS association.

In some aspects, the UE 120 may determine a PTRS-DMRS association using a one-to-one mapping. The UE 120 may determine a PTRS-DMRS association using a one-to-one mapping when the actual quantity of PTRS ports associated with a codeword corresponds to a quantity of layers, that use different antenna port subgroups (e.g., as indicated by a precoding indicator associated with the codeword), of an antenna port group associated with the codeword. Moreover, one or more bits in the PTRS-DMRS field of the DCI may be reserved when a one-to-one mapping is used.

In some aspects, the actual quantity of PTRS ports associated with a codeword may be two PTRS ports, and the codeword may be transmitted using two layers that use different antenna port subgroups. In this example, the PTRS ports and the layers (e.g., respective DMRS ports associated with the layers) may be mapped one-to-one in order (e.g., a lowest-index PTRS port may be associated with a lowest-index layer, and a highest-index PTRS port may be associated with a highest-index layer). In some aspects, the actual quantity of PTRS ports associated with a codeword may be one PTRS port, and the codeword may be transmitted using one layer. In this example, the PTRS port and the layer (e.g., a DMRS port associated with the layer) may be mapped one-to-one.

In some aspects, the UE 120 may determine a PTRS density for one or more PTRS ports associated with a codeword. In some aspects, the UE 120 may determine a time density for a PTRS port based at least in part on one or more MCSs identified in the DCI.

In some aspects, the UE 120 may determine a common time density that is to be used for PTRS ports associated with the multiple codewords based at least in part on a highest MCS indicated in the DCI for the multiple codewords. For example, the DCI may indicate a first MCS for the first codeword, and a second MCS for the second codeword. The highest MCS may be an MCS that is indicated in the DCI by a highest MCS identifier (e.g., a highest index value). The UE 120 may determine the time density, based at least in part on the highest MCS, using a table that associates MCS values and time density values (e.g., Table 6.2.3.1-1 of 3GPP Technical Specification 38.214).

In some aspects, the UE 120 may determine a time density for one or more PTRS ports associated with a codeword using an MCS that is indicated in the DCI for the codeword. For example, the UE 120 may determine a first time density for one or more PTRS ports associated with the first codeword based at least in part on a first MCS indicated for the first codeword, and a second time density for one or more PTRS ports associated with the second codeword based at least in part on a second MCS indicated for the second codeword. The UE 120 may determine a time density, based at least in part on an MCS, using the table that associates MCS values and time density values, as described above.

In some aspects, the UE 120 may determine a frequency density for a PTRS port based at least in part on a bandwidth (e.g., a bandwidth part) identified in the DCI. As described above, the DCI may indicate the same bandwidth (e.g., the same bandwidth part) for the multiple codewords (e.g., a first bandwidth indicated for the first codeword may be the same as a second bandwidth indicated for the second codeword). Accordingly, the UE 120 may determine a common frequency density that is to be used for one or more PTRS ports associated with the first codeword and one or more PTRS ports associated with the second codeword based at least in part on the indicated bandwidth. The UE 120 may determine the frequency density, based at least in part on the indicated bandwidth, using a table that associates bandwidth values and frequency density values (e.g., Table 6.2.3.1-2 of 3GPP Technical Specification 38.214).

In some aspects, the UE 120 may determine a power boosting (PB) for a PTRS port associated with a codeword. The power boosting may be based at least in part on a quantity of layers that are to be used to transmit the codeword (e.g., as indicated by a precoder matrix) (X), a total quantity of PTRS ports that are associated with the multiple codewords (e.g., a quantity of muted frequency resource elements associated with the multiple codewords) (Y), a coherency type associated with a precoding indicator (e.g., a TPMI or an SRI) for the codeword, a codebook subset type reported by the UE 120, and/or the like. In some aspects, a power boosting for a PTRS relative to a PUSCH may be expressed as $PB = 10 \cdot \log_{10}(X \cdot Y)$.

In some aspects, with respect to a PTRS for a codeword, X may have a value of one when a precoding indicator (e.g., a TPMI) for the codeword is associated with partial coherence or non-coherence (e.g., when a quantity of layers scheduled for the codeword is up to two layers). In some aspects, with respect to a PTRS for a codeword, X may have a value of one when a precoding indicator (e.g., a TPMI) for the codeword is associated with non-coherence, and a capability report transmitted by the UE 120 indicates a full/partial/non-coherence codebook subset type for the codeword (e.g., when a quantity of layers scheduled for the codeword is up to four layers, such as three layers or four layers).

In some aspects, with respect to a PTRS for a codeword, X may have a value corresponding to a quantity of layers that are to be used to transmit the codeword (e.g., as indicated by a TPMI for the codeword) when a precoding indicator (e.g., a TPMI) for the codeword is associated with full coherence. In some aspects, with respect to a PTRS for a codeword i, X may be expressed as $$X = \mathrm{floor}\left(\frac{\mathrm{sign}(Li - 3) + 3}{2}\right)$$

(where Li represents a quantity of layers scheduled for the codeword i, and sign corresponds to +1 if Li−3 is a positive value or −1 if Li−3 is a negative value), when a precoding indicator (e.g., a TPMI) for the codeword is associated with partial coherence, and a capability report transmitted by the UE 120 indicates a partial/non-coherence codebook subset type for the codeword (e.g., when a quantity of layers scheduled for the codeword is more than two layers, such as three layers or four layers). For example, if Li is greater than 3, X is 2, and if Li is less than or equal to 3, X is 1.

In some aspects, a value of Y may be expressed as $Y = Qp0 + Qp1$, where Qp0 corresponds to an actual quantity of PTRS ports associated with the first codeword, and Qp1 corresponds to an actual quantity of PTRS ports associated with the second codeword.

In some aspects, a ratio of power used by the UE 120 for a PUSCH and a power used by the UE 120 for a PTRS ($\rho_{PTRS}^{PUSCH}$) may be expressed as $\rho_{PTRS,i}^{PUSCH} = -\alpha_{PTRS,i}^{PUSCH}$ [dB], and values for $\alpha_{PTRS}^{PUSCH}$ are shown in Table 1:

TABLE 1

| UL-PTRS-power | The quantity of PUSCH layers ($n_{layer,i}^{PUSCH}$) | | |
|---|---|---|---|
| | 1 | 2 | |
| | All cases | Full coherent | Partial and non-coherent and non-codebook based |
| 00 | $10 \cdot \log_{10}(1 + Q_{p1})$ | $10 \cdot \log_{10}(2(1 + Q_{p1}))$ | $10 \cdot \log_{10}(Q_{p0} + Q_{p1})$ |
| 01 | 3 | 3 | 3 |
| 10 | | Reserved | |
| 11 | | | | where UL-PTRS-power represents a value of a higher-layer PTRS power parameter configured for the UE 120, and $n_{layer,i}^{PUSCH}$ represents a quantity of layers that are to be used to transmit a codeword i (e.g., used to transmit a PUSCH using the codeword i).

Figure 6:
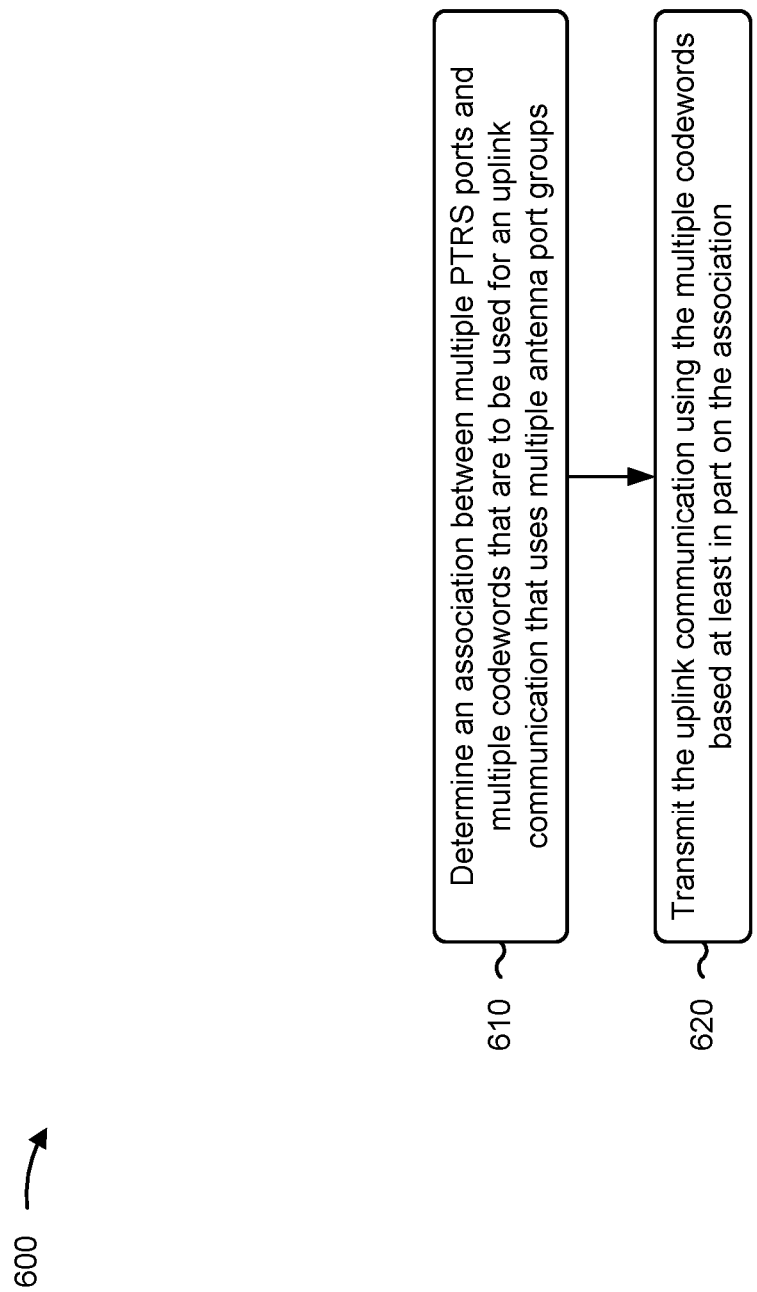
FIG. 6 is a diagram illustrating an example process performed, for example, by a UE, in accordance with various aspects of the present disclosure.

Table 2 shows power boosting values for a codeword (CW0) in relation to another codeword (CW1) for various combinations of transmission layers associated with full coherency (F), partial coherency (P), or non-coherency (N). In Table 2, values are shown in the format (Q1, Q2, X·Y), where Q1 represents a quantity of PTRS ports associated with CW0 (e.g., Qp0), Q2 represents a quantity of PTRS ports associated with CW1 (e.g., Qp1), and X·Y is for CW0, as described above:

As further shown in FIG. 6, in some aspects, process 600 may include transmitting the uplink communication using the multiple codewords based at least in part on the association (block 620). For example, the UE (e.g., using controller/processor 280, transmit processor 264, TX MIMO processor 266, MOD 254, antenna 252, and/or the like) may transmit the uplink communication using the multiple codewords based at least in part on the association, as described above.

TABLE 2

|  | 1 layer F in CW1 | 2 layers F in CW1 | 1 layer P in CW1 | 2 layers P in CW1 | 1 layer N in CW1 | 2 layers N in CW1 |
| --- | --- | --- | --- | --- | --- | --- |
| 1 layer F in CW0 | (1, 1, 1 × 2) | (1, 1, 1 × 2) | (1, 1, 1 × 2) | (1, Q2, 1 × (Q2 + 1)) | (1, 1, 1 × 2) | (1, Q2, 1 × (Q2 + 1)) |
| 2 layers F in CW0 | (1, 1, 2 × 2) | (1, 1, 2 × 2) | (1, 1, 2 × 2) | (1, Q2, 2 × (Q2 + 1)) | (1, 1, 2 × 2) | (1, Q2, 2 × (Q2 + 1)) |
| 1 layer P in CW0 | (1, 1, 1 × 2) | (1, 1, 1 × 2) | (1, 1, 1 × 2) | (1, Q2, 1 × (Q2 + 1)) | (1, 1, 1 × 2) | (1, Q2, 1 × (Q2 + 1)) |
| 2 layers P in CW0 | (Q1, 1, 1 × (Q1 + 1)) | (Q1, 1, 1 × (Q1 + 1)) | (Q1, 1, 1 × (Q1 + 1)) | (Q1, Q2, 1 × (Q1 + Q2) | (Q1, 1, 1 × (Q1 + 1)) | (Q1, Q2, 1 × (Q1 + Q2) |
| 1 layer N in CW0 | (1, 1, 1 × 2) | (1, 1, 1 × 2) | (1, 1, 1 × 2) | (1, Q2, 1 × (Q2 + 1)) | (1, 1, 1 × 2) | (1, Q2, 1 × (Q2 + 1)) |
| 2 layers N in CW0 | (Q1, 1, 1 × (Q1 + 1)) | (Q1, 1, 1 × (Q1 + 1)) | (Q1, 1, 1 × (Q1 + 1)) | (Q1, Q2, 1 × (Q1 + Q2) | (Q1, 1, 1 × (Q1 + 1)) | (Q1, Q2, 1 × (Q1 + Q2)) |

In some aspects, CW0 may be one of the first codeword or the second codeword described above, and CW1 may be the other of the first codeword or the second codeword described above.

As shown by reference number 515, the UE 120 may communicate with the BS 110 using multiple antenna panels based at least in part on the determined PTRS configuration. For example, the UE 120 may transmit the multi-panel uplink communication based at least in part on the determined PTRS configuration. As an example, the UE 120 may transmit a first PUSCH transmission (e.g., one or more PTRSs associated with the first codeword, and the first codeword) using a first antenna port group (e.g., using a first beam), and transmit a second PUSCH transmission (e.g., one or more PTRSs associated with the second codeword, and the second codeword) using a second antenna port group (e.g., using a second beam). In some aspects, the UE 120 may transmit the first PUSCH transmission to a first TRP (e.g., associated with the BS 110) and the second PUSCH transmission to a second TRP (e.g., associated with the BS 110 or another BS).

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where the UE (e.g., UE 120, and/or the like) performs operations associated with configuration for PTRS ports to enable uplink transmission with multiple codewords.

As shown in FIG. 6, in some aspects, process 600 may include determining an association between multiple PTRS ports and multiple codewords that are to be used for an uplink communication that uses multiple antenna port groups (block 610). For example, the UE (e.g., using controller/processor 280, and/or the like) may determine an association between multiple PTRS ports and multiple codewords that are to be used for an uplink communication that uses multiple antenna port groups, as described above.

Process 600 may include additional aspects, such as any single aspect or any combination of aspects described below and/or in connection with one or more other processes described elsewhere herein.

In a first aspect, a maximum quantity of PTRS ports that are to be associated with a codeword is based at least in part on a capability report on codebook type transmitted by the UE for an antenna port group associated with the codeword.

In a second aspect, alone or in combination with the first aspect, more than one PTRS port is to be associated with the codeword, a first PTRS port is to be associated with a first antenna port subgroup of the antenna port group, and a second PTRS port is to be associated with a second antenna port subgroup of the antenna port group.

In a third aspect, alone or in combination with one or more of the first and second aspects, only a single PTRS port is to be associated with the codeword, and the single PTRS port is to be associated with a first antenna port subgroup and a second antenna port subgroup of the antenna port group.

In a fourth aspect, alone or in combination with one or more of the first through third aspects, a quantity of PTRS ports that are associated with a codeword is based at least in part on a precoding indicator indicated for the codeword.

In a fifth aspect, alone or in combination with one or more of the first through fourth aspects, multiple PTRS ports are associated with the codeword when: the precoding indicator indicates precoders for a first antenna port subgroup and a second antenna port subgroup of an antenna port group associated with the codeword, and a maximum quantity of PTRS ports that are to be associated with the codeword is more than one PTRS port.

In a sixth aspect, alone or in combination with one or more of the first through fifth aspects, only a single PTRS port is associated with the codeword when: the precoding indicator indicates precoders for one of a first antenna port subgroup or a second antenna port subgroup of an antenna port group associated with the codeword, and a maximum quantity of PTRS ports that are to be associated with the codeword is more than one PTRS port.

In a seventh aspect, alone or in combination with one or more of the first through sixth aspects, only a single PTRS port is associated with the codeword when a maximum quantity of PTRS ports that are to be associated with the codeword is one PTRS port.

In an eighth aspect, alone or in combination with one or more of the first through seventh aspects, process 600 includes determining a mapping of a DMRS port to a PTRS port associated with a codeword, and the PTRS port is to use a same precoding as a layer, associated with the DMRS port, identified by a precoding indicator indicated for the codeword.

In a ninth aspect, alone or in combination with one or more of the first through eighth aspects, the mapping is based at least in part on an indication in downlink control information when: only a single PTRS port is associated with the codeword, and the precoding indicator identifies precoders for multiple layers that use a same antenna port subgroup of an antenna port group associated with the codeword.

In a tenth aspect, alone or in combination with one or more of the first through ninth aspects, the mapping is a one-to-one mapping when a quantity of PTRS ports associated with the codeword corresponds to a quantity of layers, identified by the precoding indicator, that use different antenna port subgroups of an antenna port group associated with the codeword.

In an eleventh aspect, alone or in combination with one or more of the first through tenth aspects, process 600 includes determining a time density for the multiple PTRS ports associated with the multiple codewords based at least in part on a highest MCS indicated for the multiple codewords.

In a twelfth aspect, alone or in combination with one or more of the first through eleventh aspects, process 600 includes determining a time density for one or more PTRS ports associated with a codeword based at least in part on an MCS indicated for the codeword.

In a thirteenth aspect, alone or in combination with one or more of the first through twelfth aspects, process 600 includes determining a frequency density for the multiple PTRS ports associated with the multiple codewords based at least in part on a bandwidth associated with the multiple codewords.

In a fourteenth aspect, alone or in combination with one or more of the first through thirteenth aspects, process 600 includes determining a power boosting for a PTRS port associated with a codeword based at least in part on a quantity of layers that are identified by a precoding indicator for the codeword and a total quantity of PTRS ports that are associated with the multiple codewords.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
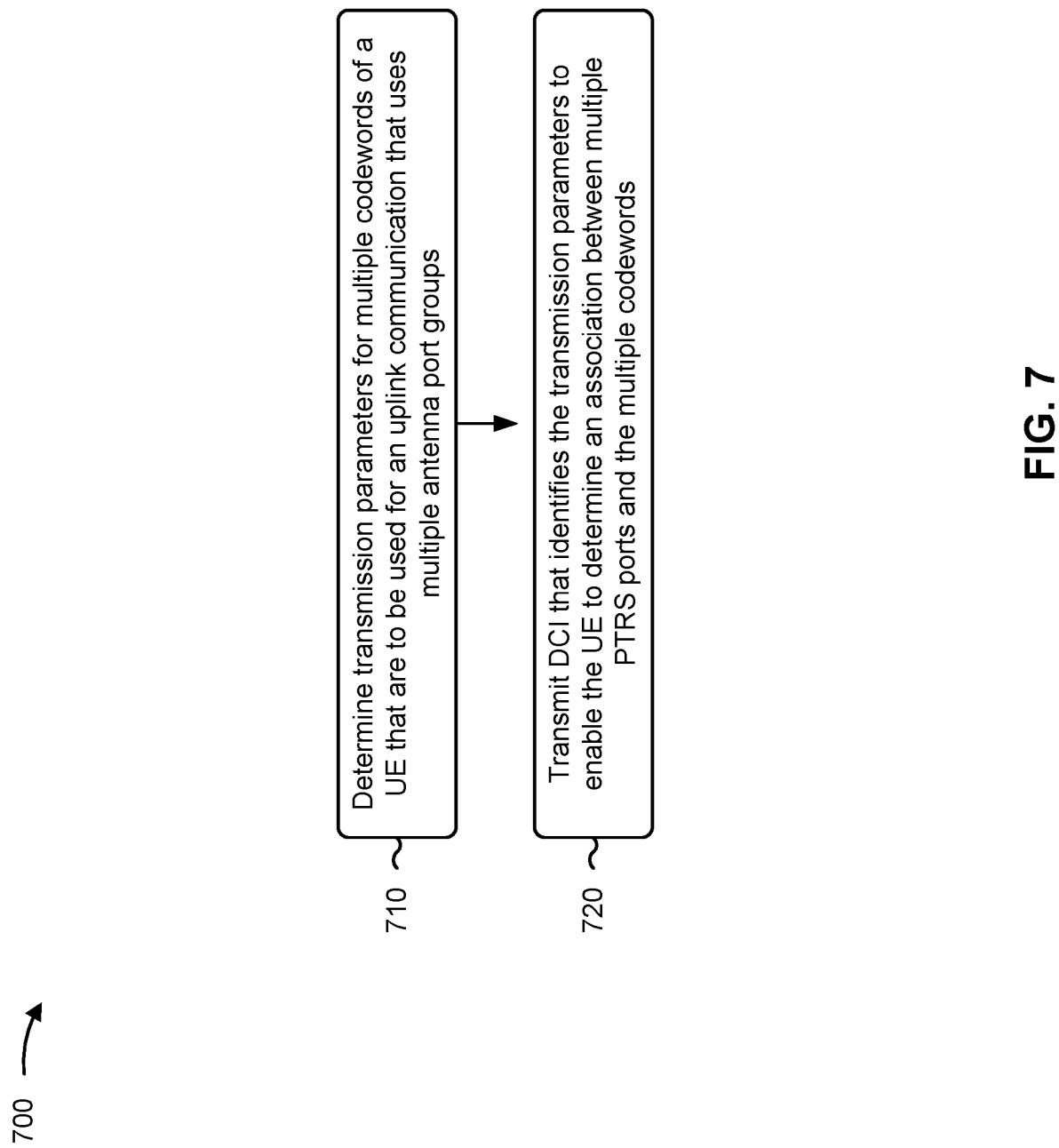
FIG. 7 is a diagram illustrating an example process performed, for example, by a BS, in accordance with various aspects of the present disclosure.

FIG. 7 is a diagram illustrating an example process 700 performed, for example, by a base station, in accordance with various aspects of the present disclosure. Example process 700 is an example where the base station (e.g., base station 110, and/or the like) performs operations associated with configuration for PTRS ports to enable uplink transmission with multiple codewords.

As shown in FIG. 7, in some aspects, process 700 may include determining transmission parameters for multiple codewords of a UE that are to be used for an uplink communication that uses multiple antenna port groups (block 710). For example, the base station (e.g., using controller/processor 240, and/or the like) may determine transmission parameters for multiple codewords of a UE that are to be used for an uplink communication that uses multiple antenna port groups, as described above.

As further shown in FIG. 7, in some aspects, process 700 may include transmitting DCI that identifies the transmission parameters to enable the UE to determine an association between multiple PTRS ports and the multiple codewords (block 720). For example, the base station (e.g., using controller/processor 240, transmit processor 220, TX MIMO processor 230, MOD 232, antenna 234, and/or the like) may transmit DCI that identifies the transmission parameters to enable the UE to determine an association between multiple PTRS ports and the multiple codewords, as described above.

Process 700 may include additional aspects, such as any single aspect or any combination of aspects described below and/or in connection with one or more other processes described elsewhere herein.

In a first aspect, process 700 includes determining a maximum quantity of PTRS ports that are to be associated with a codeword based at least in part on a capability report on codebook type transmitted by the UE for an antenna port group associated with the codeword.

In a second aspect, alone or in combination with the first aspect, more than one PTRS port is to be associated with the codeword, a first PTRS port is to be associated with a first antenna port subgroup of the antenna port group, and a second PTRS port is to be associated with a second antenna port subgroup of the antenna port group.

In a third aspect, alone or in combination with one or more of the first and second aspects, only a single PTRS port is to be associated with the codeword, and the single PTRS port is to be associated with a first antenna port subgroup and a second antenna port subgroup of the antenna port group.

In a fourth aspect, alone or in combination with one or more of the first through third aspects, a quantity of PTRS ports that are to be associated with a codeword is based at least in part on a precoding indicator indicated by the transmission parameters for the codeword.

In a fifth aspect, alone or in combination with one or more of the first through fourth aspects, multiple PTRS ports are to be associated with the codeword when: the precoding indicator indicates precoders for a first antenna port subgroup and a second antenna port subgroup of an antenna port group associated with the codeword, and a maximum quantity of PTRS ports that are to be associated with the codeword is more than one PTRS port.

In a sixth aspect, alone or in combination with one or more of the first through fifth aspects, only a single PTRS port is to be associated with the codeword when: the precoding indicator indicates precoders for one of a first antenna port subgroup or a second antenna port subgroup of an antenna port group associated with the codeword, and a maximum quantity of PTRS ports that are to be associated with the codeword is more than one PTRS port.

In a seventh aspect, alone or in combination with one or more of the first through sixth aspects, only a single PTRS port is to be associated with the codeword when a maximum quantity of PTRS ports that are to be associated with the codeword is one PTRS port.

In an eighth aspect, alone or in combination with one or more of the first through seventh aspects, transmitting the DCI that identifies the transmission parameters is to further enable the UE to determine a mapping of a DMRS port to a PTRS port associated with a codeword, and the PTRS port is to use a same precoding as a layer, associated with the DMRS port, identified by a precoding indicator indicated by the transmission parameters for the codeword.

In a ninth aspect, alone or in combination with one or more of the first through eighth aspects, the DCI includes an indication of the mapping when: only a single PTRS port is associated with the codeword, and the precoding indicator identifies precoders for multiple layers that use a same antenna port subgroup of an antenna port group associated with the codeword.

In a tenth aspect, alone or in combination with one or more of the first through ninth aspects, the mapping is a one-to-one mapping when a quantity of PTRS ports associated with the codeword corresponds to a quantity of layers, identified by the precoding indicator, that use different antenna port subgroups of an antenna port group associated with the codeword.

In an eleventh aspect, alone or in combination with one or more of the first through tenth aspects, transmitting the DCI that identifies the transmission parameters is to further enable the UE to determine a time density for the multiple PTRS ports that are to be associated with the multiple codewords based at least in part on a highest MCS indicated by the transmission parameters for the multiple codewords.

In a twelfth aspect, alone or in combination with one or more of the first through eleventh aspects, transmitting the DCI that identifies the transmission parameters is to further enable the UE to determine a time density for one or more PTRS ports that are to be associated with a codeword based at least in part on an MCS indicated by the transmission parameters for the codeword.

In a thirteenth aspect, alone or in combination with one or more of the first through twelfth aspects, transmitting the DCI that identifies the transmission parameters is to further enable the UE to determine a frequency density for the multiple PTRS ports that are to be associated with the multiple codewords based at least in part on a bandwidth indicated by the transmission parameters for the multiple codewords.

In a fourteenth aspect, alone or in combination with one or more of the first through thirteenth aspects, transmitting the DCI that identifies the transmission parameters is to further enable the UE to determine a power boosting for a PTRS port that is to be associated with a codeword based at least in part on a quantity of layers that are identified by a precoding indicator indicated by the transmission parameters for the codeword and a total quantity of PTRS ports that are to be associated with the multiple codewords.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a user equipment (UE), comprising:
   receiving downlink control information (DCI) that identifies transmission parameters for multiple codewords for an uplink communication, the uplink communication to use multiple antenna port groups; and
   transmitting the uplink communication using the multiple codewords based at least in part on an association between phase tracking reference signal (PTRS) ports and the multiple codewords, a time density for the PTRS ports associated with the multiple codewords being based at least in part on a highest modulation and coding scheme for the multiple codewords, a power boosting for a PTRS port associated with a codeword, of the multiple codewords, being based at least in part on a quantity of layers that are identified by a precoding indicator indicated by the transmission parameters for the codeword and a total quantity of PTRS ports that are associated with the multiple codewords.

2. The method of claim 1, wherein a maximum quantity of PTRS ports associated with the codeword, of the multiple codewords, is based at least in part on a UE capability report on codebook type for an antenna port group, of the multiple antenna port groups, associated with the codeword.

3. The method of claim 2, wherein:
multiple PTRS ports are associated with the codeword;
a first PTRS port, of the multiple PTRS ports, is associated with a first antenna port subgroup of the antenna port group; and
a second PTRS port, of the multiple PTRS ports, is associated with a second antenna port subgroup of the antenna port group.

4. The method of claim 2, wherein a single PTRS port is associated with the codeword, and the single PTRS port is associated with a first antenna port subgroup and a second antenna port subgroup of the antenna port group.

5. The method of claim 1, wherein a quantity of PTRS ports that are associated with the codeword, of the multiple codewords, is based at least in part on the precoding indicator indicated by the transmission parameters for the codeword.

6. The method of claim 5, wherein multiple PTRS ports are associated with the codeword responsive to:
the precoding indicator indicating precoders for a first antenna port subgroup and a second antenna port subgroup of an antenna port group, of the multiple antenna port groups, associated with the codeword, and
a maximum quantity of PTRS ports that are to be associated with the codeword being more than one PTRS port.

7. The method of claim 5, wherein a single PTRS port is associated with the codeword responsive to:
the precoding indicator indicating precoders for one of a first antenna port subgroup or a second antenna port subgroup of an antenna port group, of the multiple antenna port groups, associated with the codeword, and
a maximum quantity of PTRS ports that are associated with the codeword being more than one PTRS port.

8. The method of claim 5, wherein a single PTRS port is associated with the codeword responsive to a maximum quantity of PTRS ports that are associated with the codeword being one PTRS port.

9. The method of claim 1, further comprising:
determining a mapping of a demodulation reference signal (DMRS) port to the PTRS port associated with the codeword of the multiple codewords,
wherein the PTRS port uses a same precoding as a layer, associated with the DMRS port, identified by the precoding indicator indicated by the transmission parameters for the codeword.

10. The method of claim 9, wherein the mapping is based at least in part on an indication in the DCI responsive to:
a single PTRS port being associated with the codeword, and
the precoding indicator identifying precoders for multiple layers that use a same antenna port subgroup of an antenna port group, of the multiple antenna port groups, associated with the codeword.

11. The method of claim 9, wherein the mapping is a one-to-one mapping responsive to a quantity of PTRS ports associated with the codeword corresponding to the quantity of layers, identified by the precoding indicator, that use different antenna port subgroups of an antenna port group, of the multiple antenna port groups, associated with the codeword.

12. The method of claim 1, further comprising:
determining the time density for the PTRS ports associated with the multiple codewords based at least in part on the highest modulation and coding scheme for the multiple codewords, wherein the highest modulation and coding scheme is indicated by the transmission parameters for the multiple codewords.

13. The method of claim 1, wherein:
a frequency density for the PTRS ports associated with the multiple codewords is based at least in part on a bandwidth indicated by the transmission parameters for the multiple codewords.

14. A method of wireless communication performed at a network entity, comprising:
transmitting downlink control information (DCI) that identifies transmission parameters for multiple codewords for an uplink communication, wherein the uplink communication uses multiple antenna port groups; and
receiving the uplink communication that uses the multiple codewords based at least in part on an association between phase tracking reference signal (PTRS) ports and the multiple codewords, a time density for the PTRS ports associated with the multiple codewords being based at least in part on a highest modulation and coding scheme for the multiple codewords, a power boosting for a PTRS port associated with a codeword, of the multiple codewords, being based at least in part on a quantity of layers that are identified by a precoding indicator indicated by the transmission parameters for the codeword and a total quantity of PTRS ports that are associated with the multiple codewords.

15. The method of claim 14, wherein:
a maximum quantity of PTRS ports associated with the codeword, of the multiple codewords, is based at least in part on a user equipment capability report on codebook type for an antenna port group, of the multiple antenna port groups, associated with the codeword.

16. The method of claim 15, wherein:
multiple PTRS ports are associated with the codeword;
a first PTRS port, of the multiple PTRS ports, is to be associated with a first antenna port subgroup of the antenna port group; and
a second PTRS port is to be associated with a second antenna port subgroup of the antenna port group.

17. The method of claim 15, wherein a single PTRS port is associated with the codeword, and the single PTRS port is associated with a first antenna port subgroup and a second antenna port subgroup of the antenna port group.

18. The method of claim 14, wherein a quantity of PTRS ports that are to be associated with the codeword, of the multiple codewords, is based at least in part on the precoding indicator indicated by the transmission parameters for the codeword.

19. The method of claim 18, wherein multiple PTRS ports are associated with the codeword responsive to:
the precoding indicator indicating precoders for a first antenna port subgroup and a second antenna port subgroup of an antenna port group, of the multiple antenna port groups, associated with the codeword, and
a maximum quantity of PTRS ports that are associated with the codeword being more than one PTRS port.

20. The method of claim 18, wherein a single PTRS port is to be associated with the codeword responsive to:
the precoding indicator indicating precoders for one of a first antenna port subgroup or a second antenna port subgroup of an antenna port group, of the multiple antenna port groups, associated with the codeword, and
a maximum quantity of PTRS ports that are associated with the codeword being more than one PTRS port.

21. The method of claim 18, wherein a single PTRS port is to be associated with the codeword responsive to a maximum quantity of PTRS ports that are associated with the codeword being one PTRS port.

22. An apparatus for wireless communication at a user equipment (UE), comprising:
one or more memories; and
one or more processors, coupled to the one or more memories, configured to cause the UE to:
receive downlink control information (DCI) that identifies transmission parameters for multiple codewords for an uplink communication, the uplink communication to use multiple antenna port groups; and
transmit the uplink communication using the multiple codewords based at least in part on an association between phase tracking reference signal (PTRS) ports and the multiple codewords, wherein:
a time density for the PTRS ports associated with the multiple codewords is based at least in part on a highest modulation and coding scheme for the multiple codewords; and
a power boosting for a PTRS port associated with a codeword, of the multiple codewords, is based at least in part on a quantity of layers that are identified by a precoding indicator indicated by the transmission parameters for the codeword and a total quantity of PTRS ports that are associated with the multiple codewords.

23. An apparatus for wireless communication at a network entity, comprising:
one or more memories; and
one or more processors, coupled to the one or more memories, configured to cause the network entity to:
transmit downlink control information (DCI) that identifies transmission parameters for multiple codewords for an uplink communication, the uplink communication to use multiple antenna port groups; and
receive the uplink communication that uses the multiple codewords based at least in part on an association between phase tracking reference signal (PTRS) ports and the multiple codewords, wherein:
a time density for the PTRS ports associated with the multiple codewords is based at least in part on a highest modulation and coding scheme for the multiple codewords; and
a power boosting for a PTRS port associated with a codeword, of the multiple codewords, is based at least in part on a quantity of layers that are identified by a precoding indicator indicated by the transmission parameters for the codeword and a total quantity of PTRS ports that are associated with the multiple codewords.

24. The apparatus of claim 22, wherein a maximum quantity of PTRS ports associated with the codeword, of the multiple codewords, is based at least in part on a UE capability report on codebook type for an antenna port group, of the multiple antenna port groups, associated with the codeword.

25. The apparatus of claim 22, wherein a quantity of PTRS ports that are associated with the codeword, of the multiple codewords, is based at least in part on the precoding indicator indicated by the transmission parameters for the codeword.

26. The apparatus of claim 22, wherein the one or more processors are further configured to cause the UE to:
determine a mapping of a demodulation reference signal (DMRS) port to a PTRS port associated with the codeword of the multiple codewords,
wherein the PTRS port is to use a same precoding as a layer, associated with the DMRS port, identified by the precoding indicator indicated by the transmission parameters for the codeword.

27. The apparatus of claim 23, wherein a maximum quantity of PTRS ports associated with the codeword, of the multiple codewords, is based at least in part on a user equipment capability report on codebook type for an antenna port group, of the multiple antenna port groups, associated with the codeword.

28. The apparatus of claim 23, wherein a quantity of PTRS ports that are to be associated with the codeword, of the multiple codewords, is based at least in part on the precoding indicator indicated by the transmission parameters for the codeword.

29. The apparatus of claim 22, wherein the one or more processors are further configured to cause the UE to:
determine the time density for the PTRS ports associated with the multiple codewords based at least in part on the highest modulation and coding scheme for the multiple codewords, wherein the highest modulation and coding scheme is indicated by the transmission parameters for the multiple codewords.

30. The apparatus of claim 22, wherein:
a frequency density for the PTRS ports associated with the multiple codewords is based at least in part on a bandwidth indicated by the transmission parameters for the multiple codewords.

31. A non-transitory computer-readable medium storing a set of instructions for wireless communication, the set of instructions comprising:
one or more instructions that, when executed by one or more processors of user equipment (UE), cause the UE to:
receive downlink control information (DCI) that identifies transmission parameters for multiple codewords for an uplink communication, the uplink communication to use multiple antenna port groups; and
transmit the uplink communication using the multiple codewords based at least in part on an association between phase tracking reference signal (PTRS) ports and the multiple codewords, wherein:
a time density for the PTRS ports associated with the multiple codewords is based at least in part on a highest modulation and coding scheme for the multiple codewords; and
a power boosting for a PTRS port associated with a codeword, of the multiple codewords, is based at least in part on a quantity of layers that are identified by a precoding indicator indicated by the transmission parameters for the codeword and a total quantity of PTRS ports that are associated with the multiple codewords.

32. A non-transitory computer-readable medium storing a set of instructions for wireless communication, the set of instructions comprising:
one or more instructions that, when executed by one or more processors of a network entity, cause the network entity to:
transmit downlink control information (DCI) that identifies transmission parameters for multiple codewords for an uplink communication, the uplink communication to use multiple antenna port groups; and
receive the uplink communication that uses the multiple codewords based at least in part on an association between phase tracking reference signal (PTRS) ports and the multiple codewords, wherein:

a time density for the PTRS ports associated with the multiple codewords is based at least in part on a highest modulation and coding scheme for the multiple codewords; and a power boosting for a PTRS port associated with a codeword, of the multiple codewords, is based at least in part on a quantity of layers that are identified by a precoding indicator indicated by the transmission parameters for the codeword and a total quantity of PTRS ports that are associated with the multiple codewords.

* * * * *